Dec. 9, 1924.

G. WHITAKER 1,518,287

COMBINATION COTTON CHOPPER AND CULTIVATOR

Filed April 27, 1923

George Whitaker
INVENTOR.

BY John M. Spellman
ATTORNEYS.

Patented Dec. 9, 1924.

1,518,287

UNITED STATES PATENT OFFICE.

GEORGE WHITAKER, OF BROWNWOOD, TEXAS.

COMBINATION COTTON CHOPPER AND CULTIVATOR.

Application filed April 27, 1923. Serial No. 635,163.

*To all whom it may concern:*

Be it known that I, GEORGE WHITAKER, a citizen of the United States, residing at Brownwood, in the county of Brown and State of Texas, have invented certain new and useful Improvements in Combination Cotton Choppers and Cultivators, of which the following is a specification.

This invention relates to new and useful improvements in cotton choppers and pertains more particularly to a combined cotton chopper and cultivator.

The present invention is an improvement over Letters Patent of the United States granted to me on February 21, 1922, Number 1,407,240, and has for its object to provide a new means and arrangement for throwing or moving the shaft carrying the revoluble blades of the chopper out of engagement with the drive shaft or axle of the machine by foot power and for automatically reengaging the gears of the cutter blade shaft with said drive wheels.

Another object is to provide cutter blades and parts adaptable to being attached to any standard cultivator and removable therefrom, so as to provide a combination cotton chopper and cultivator, and further to so arrange the operating lever controlling the cutter blades that the driver can obtain a good foot leverage to accomplish the adjustment of the blades.

The invention will be more fully understood by reference to the following description, taken in connection with the accompanying drawings, forming part hereof, in which—

Figure 1:
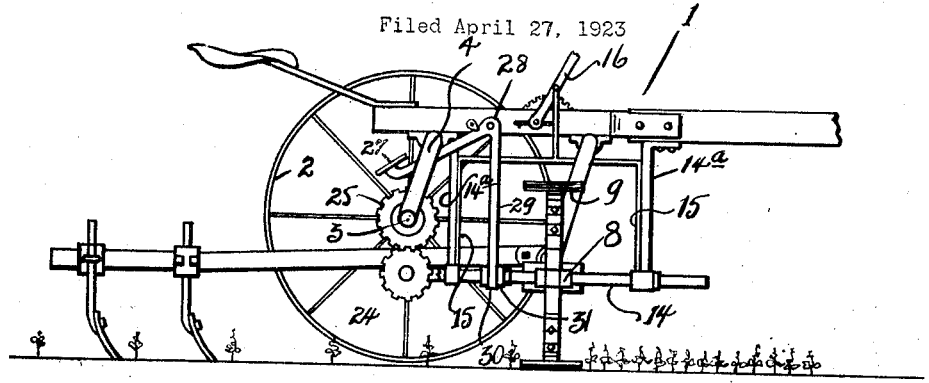
Figure 1 is a side elevational view of the invention, one drive wheel of the cultivator removed.

In carrying out the invention in its improved form attention is directed to Figure 1 in the drawing wherein the numeral 1 denotes a standard cultivator supported upon drive wheels 2—2 on axle 3 with the usual form of arch bar 4. In my former patent the hub carrying the blades was connected to a frame operated by hand to slide the blades along the shaft carrying the hub. In the present application the frame is partly eliminated and the hub 8 has radial arms 10 and 11 with teeth as shown whereby the blades may be adjusted to proper distance and tightened in place by thumb screws 12—12. The blades 9—9 have one end pointed at 13, the object of which is to provide a better cutting movement, since on the forward motion of the machine the blades will strike the plants at an angle with respect to their cutting edges and the pointed, slanted ends assist such movement.

Figure 4:
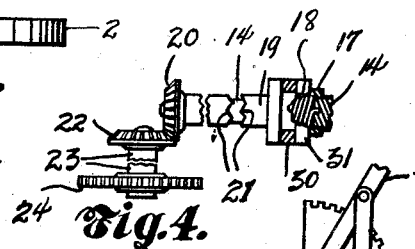
Figure 4 is a detail sectional view of the gears and their shafts.
Figures 3, 5:
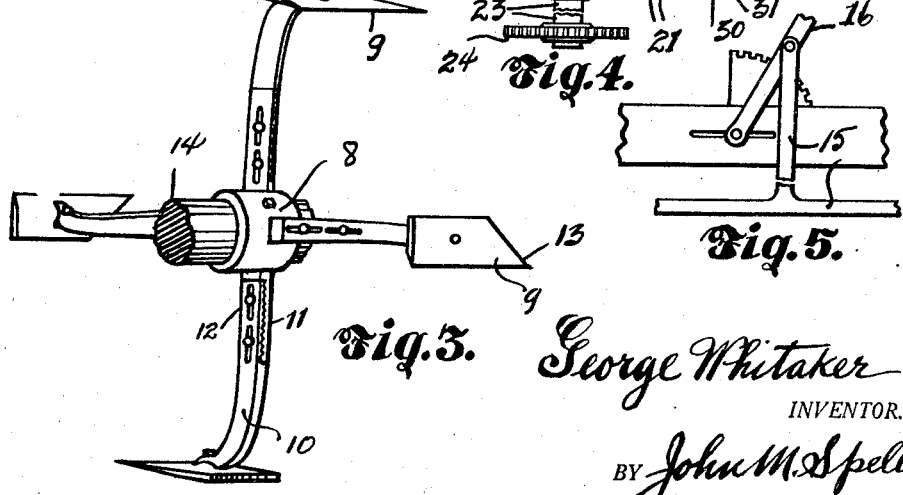
Figure 3 is an enlarged detail perspective view of the revoluble cutter blades.
Figure 5 is a detailed sectional view of the means for moving the revoluble blade out of their cutting plane when not in use.

The hub 8 is mounted on a shaft 14 which is supported at each end by depending members 14ª. These members are grooved in such a manner that a frame 15 will slide therein when operated by a lever 16 to lift the blades up when thrown out of gear when the machine is being moved from place to place and the blades are not being used. Shaft 14, see Figure 4, has mounted on one end a collar 17 for holding in place a spring 18 and on shaft 14 is also a sleeve 19. This sleeve 19 carries a bevel gear 20 and is divided at 21 to form a clutch arrangement, so that when the sleeve 19 is moved along the shaft against the spring the clutch will be thrown out of engagement. 22 is a companion gear meshing with gear 20 and carried on shaft 23, while 24 is a gear held in mesh with a gear 25 on axle 3 and rotates with the drive wheels 2—2. The means for moving sleeve 19 on shaft 14 is accomplished by a foot lever 27 pivoted at 28 to the frame of the cultivator and having on its longer end 29 a yoke 30 which straddles a member 31 and is secured thereto.

Figure 2:
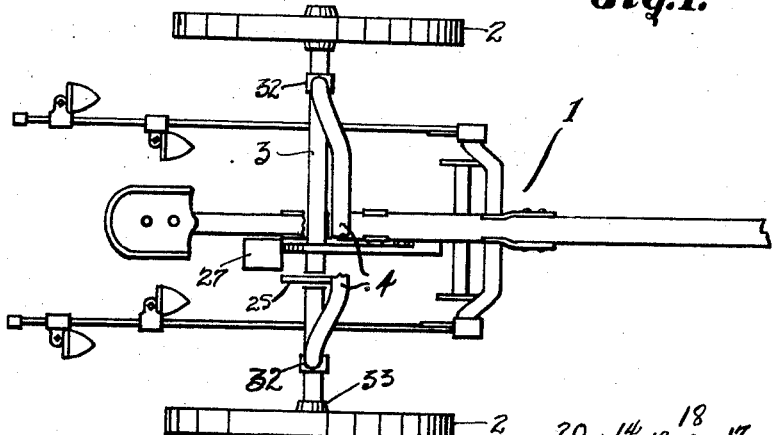
Figure 2 is a top or plan view, part broken away.

Referring to Figures 1 and 2, in order to utilize the chopper and adapt it to the ordinary cultivator of standard make, the axle 3 may be severed near each end for instance at a point 32 and its spindles or outer severed parts geared to the loose inside axle in such a manner as to permit the loose inside axle to be removed when the cultivator is used by itself. When the loose axle is taken out the blades of course and other adjacent chopper parts are also taken out. The chopper blades may also be installed on a standard cultivator by using an auxiliary axle and placing a gear on the hub of the drive wheels to be geared with said axle, such axle to be removed as explained. It should be understood, however, that any suitable means may be employed to connect the drive shaft of the revoluble blades to the wheel drive.

What is claimed is—

1. In a combined chopper and cultivator, in combination with a cultivator frame and its axle, a pair of spaced vertical members depending from the frame, a slidable frame having vertical sides slidably engaged with said respective pair of members, a lever pivoted to the cultivator frame and slidable frame for raising and lowering the slidable frame, a chopper carrying shaft carried by the vertical sides of the slidable frame, a clutch on said shaft, disengageable driving means between the axle and clutch, and a foot operated lever pivoted to the cultivator frame and connected to the clutch to operate the latter.

2. In a combined chopper and cultivator, in combination with a cultivator frame and its axle, a vertically slidable frame, means to mount said slidable frame from the cultivator frame, means to actuate the slidable frame and to hold same against sliding, a chopper carrying shaft carried by the slidable frame, a clutch mounted on said shaft, means to actuate the clutch, and means to drive the shaft from the axle and being disconnectible to allow of upward sliding of the slidable frame.

In testimony whereof I have signed my name to this specification.

GEORGE WHITAKER.